United States Patent [19]

Straton et al.

[11] Patent Number: 4,587,630
[45] Date of Patent: May 6, 1986

[54] INTELLIGENT PROGRAMMABLE TOUCHSCREEN SYSTEM

[75] Inventors: Peter R. Straton, Rocklin; Scott R. McClelland, Loomis, both of Calif.

[73] Assignee: Hewlett-Packard Company, Palo Alto, Calif.

[21] Appl. No.: 580,408

[22] Filed: Feb. 15, 1984

[51] Int. Cl.[4] ............................................. G06F 3/14
[52] U.S. Cl. ................................................... 364/900
[58] Field of Search ... 364/200 MS File, 900 MS File, 364/521; 340/709, 712, 365 VL, 365 P, 365 C

[56] References Cited

U.S. PATENT DOCUMENTS

| | | | |
|---|---|---|---|
| 3,482,241 | 12/1969 | Johnson | 340/712 |
| 3,673,327 | 6/1972 | Johnson et al. | 340/712 X |
| 4,110,749 | 8/1978 | Janko et al. | 340/712 X |
| 4,121,204 | 10/1978 | Welch et al. | 340/712 |
| 4,386,232 | 5/1983 | Slater | 340/712 X |
| 4,414,628 | 11/1983 | Ahuja et al. | 364/200 |
| 4,459,476 | 7/1984 | Weissmueller | 340/712 X |
| 4,476,463 | 10/1984 | Ng et al. | 340/712 |
| 4,521,870 | 6/1985 | Babbel et al. | 364/900 |

*Primary Examiner*—Raulfe B. Zache
*Attorney, Agent, or Firm*—Jeffery B. Fromm; Roland I. Griffin

[57] ABSTRACT

A computing system for detecting movement of a user's touch on a touchscreen and to operate an intelligent programmable device is provided. The system includes a touchscreen for detecting information of an initial touch by a user on a display surface, a change of touch on the display surface, and disengagement of the user's touch from the display surface. The detected touch information is then used to determine system operations in response to the touch information.

30 Claims, 5 Drawing Figures 4,587,630

INTELLIGENT PROGRAMMABLE TOUCHSCREEN SYSTEM

BACKGROUND OF THE INVENTION

The present invention relates to computer systems used to define a target program in response to a user's touching a screen of the system, and more particularly relates to means to make full use of the intelligence of a touchscreen system.

A touchscreen is disclosed in a co-pending application Ser. No. 533,384 by Thomas Earl Kilbourn and Scott Robert McClelland. As mentioned in that application, the touchscreen provides an effective source of information about the movement of an operator's touch action on a display surface such as a CRT. Other devices have been developed that allow the user to select a position on the display and once selected, to initiate whatever operation is associated with that position. These devices include such apparatus as "mice", graphics stylus/pads and light-pens. These devices actually consist of two mechanisms, one to provide position information and one to provide activation information to the target program. In these systems, it is up to the target program to translate the position information into the corresponding operation directive and to cause that operation to be performed when activation is required by the user. The target program is thus involved in the selection/activation process even if the operation to be performed is external to the target program. These systems usually require the use of a cursor for position feedback to the user so that the user can see what position is currently being selected. Thus, there is no intelligence inherent in these systems. They simply provide position and activation information to the target program.

In other systems, mechanical function keys are provided on the physical keyboard arranged in a manner such that they correspond in relative position to labels that are displayed along the bottom of the display screen. By performing a visual correlation between the position of a label on the display and the position of a function key on the keyboard, the user is able to select the appropriate function key to be pressed in order to perform the operation desired. Because the function labels are separate from the function key, it is possible to make an erroneous selection.

SUMMARY OF THE INVENTION

In accordance with a preferred embodiment of the present invention, there is provided an intelligent programmable touchscreen system. The main effect of providing this environment is that the target program can define a "soft keyboard" on the display that is totally independent of a physical keyboard and hence is not constrained by the limitations of the traditional physical keyboard. The "keys", in the present environment, are implemented using touch fields. The keys can be of any size, shape and position on the display within the physical constrains of the dimensions and character resolution of the display. Furthermore, the target program can define keys that are of different forms, using different user feedback modes and having different operation types. The operation type of a particular set of keys can change dynamically with the state of the target program. And the whole keyboard can change from one keyboard form to another dynamically with the state of the target program. Thus, the input/output functionality constraints imposed upon the target program by the traditional keyboard/display environment can be greatly reduced by the use of the touchscreen firmware environment of the present invention. This allows the target program to be a more powerful tool for the user than is otherwise possible. Hence, the present invention provides us with an intelligent programmable touchscreen system.

DESCRIPTION OF THE PREFERRED EMBODIMENT

Figure 1:
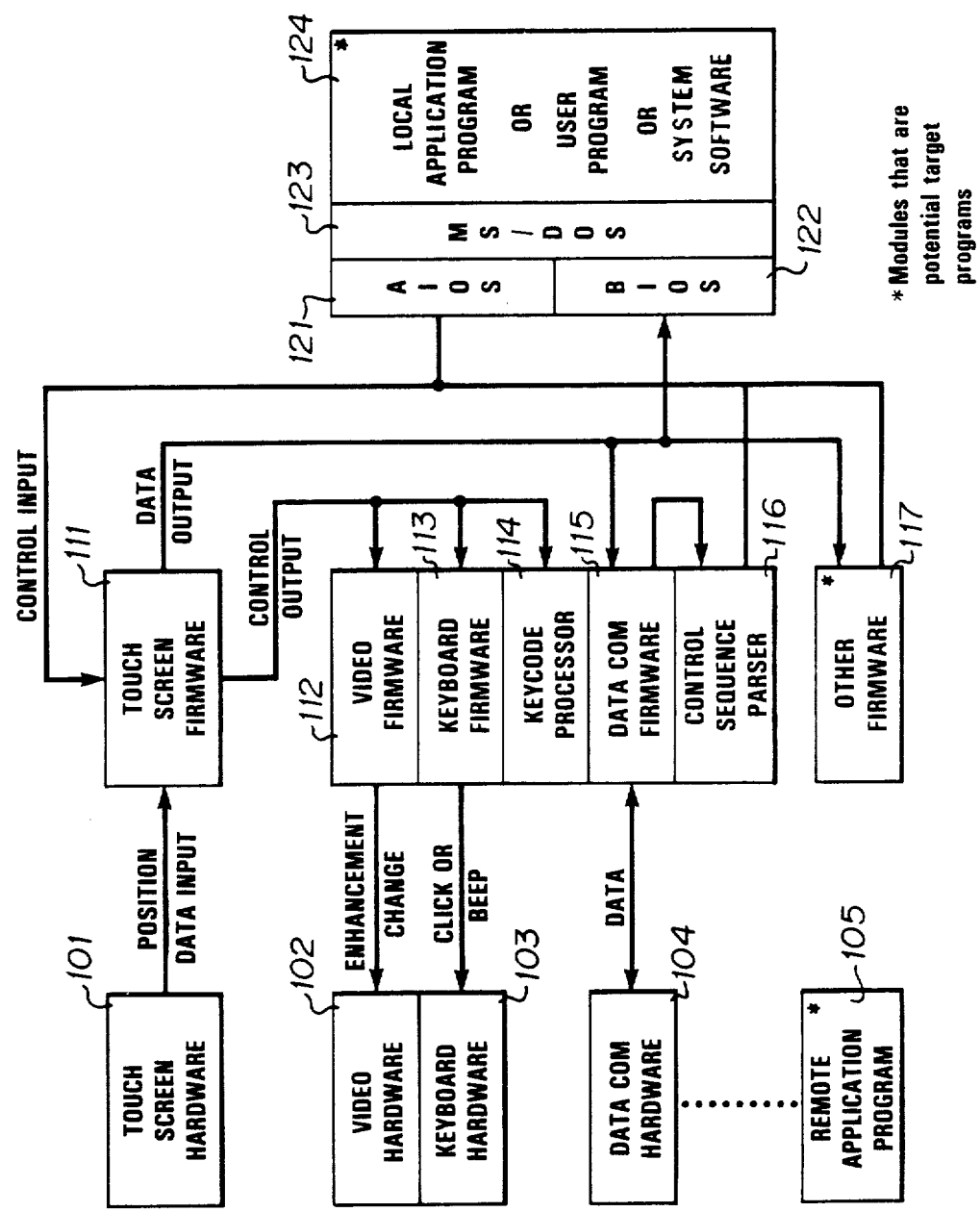
FIG. 1 is a block diagram of a preferred embodiment of the present invention describing touchscreen control and data paths of the system.

In FIG. 1, an intelligent programmable touchscreen system is shown as a configuration of hardware, firmware and software. In the embodiment of the invention, the touchscreen system includes touchscreen hardware 101, video hardware 102, keyboard hardware 103, and data communication hardware 104. The touchscreen system also includes touchscreen firmware 111, video firmware 112, keyboard firmware 113, keycode processor firmware 114, data communication firmware 115, control sequence parser firmware 116, and other firmware 117. The system further includes an operating system 123 such as MS/DOS available from Microsoft Inc., of Bellevue, Wash., operating under AIOS (Alphanumeric input output system) 121 and BIOS (Basic input output system) 122 to control local application, user, or system software programs 124.

Hereunder the intelligent programmable touchscreen system of this invention will be explained more precisely in order of the touchscreen firmware 111, the AIOS touchscreen interface 121, touchscreen control sequences, and touchscreen report sequences.

The touchscreen firmware module 111 consists of a set of firmware routines which define a simple to use yet powerful virtual machine for touchscreen operations. The virtual machine accepts data input from the the touchscreen hardware 101 and control input from the target program 105, 117 and 124, and outputs data to the target program 105, 117 and 124, and control operations to other parts of the system firmware 112, 113, and 114. The target program is usually a software application program 124 running under the MS/DOS operating system 123. However, the target program can also be another firmware module 117 (for example, configuration firmware), system software 124 (for example, Personal Application Manager PAM), software 124 written by the user, or a program 105 running on a remote computer, communicating by means of a data communication port 115 and 104.

The following description is an overview description of the functionality of the touchscreen firmware 111. A detailed description of the control input and data output formats for the touchscreen firmware 111 and the control operations initiated by the touchscreen firmware is provided in the AIOS touchscreen interface description and the touchscreen control and report sequence description.

I. Touchscreen Firmware

(A) Data input to the touchscreen firmware

Figure 2:
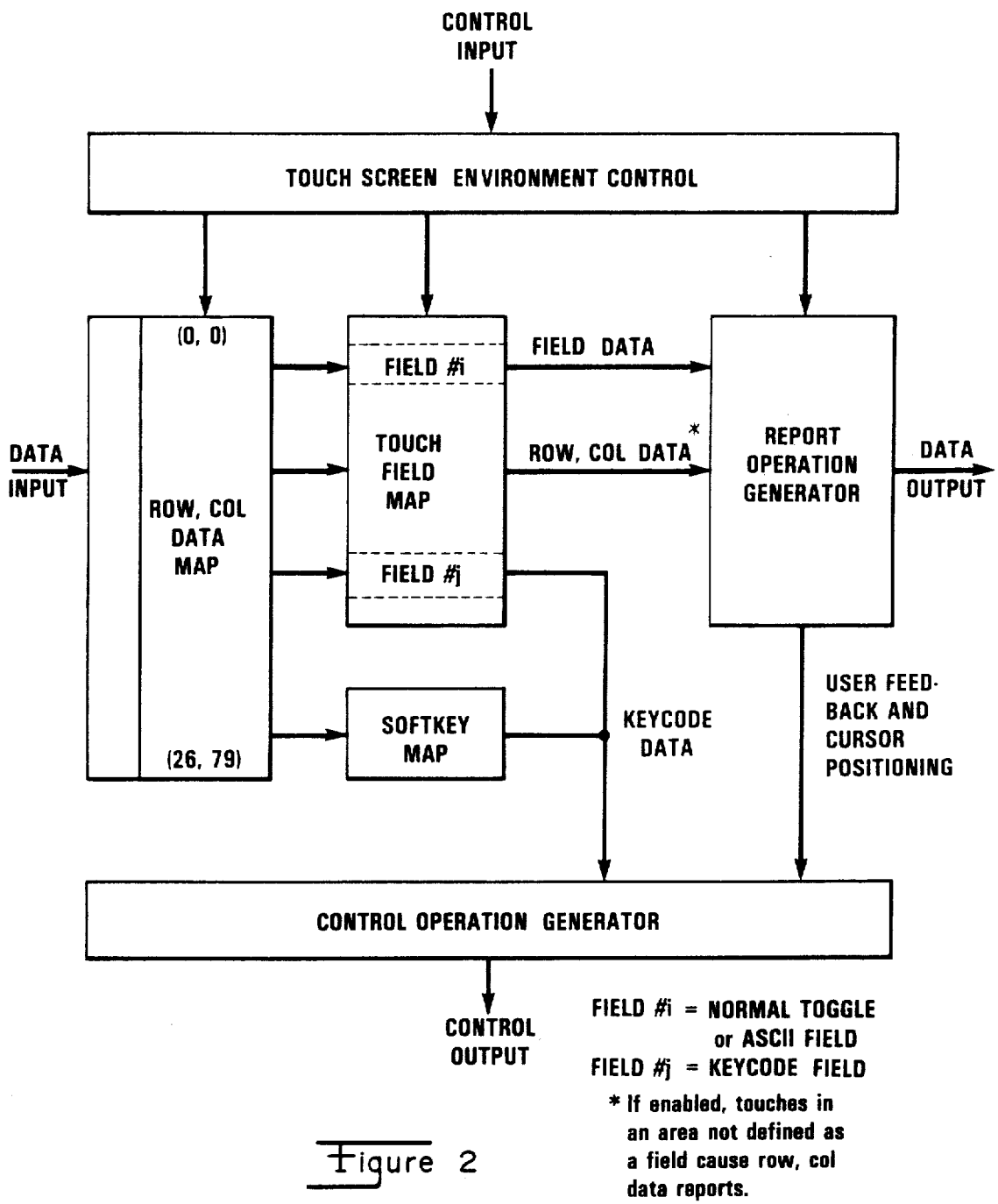
FIG. 2 is a block diagram of the mapping mechanism from touch position to control and data operations of the system.

The touchscreen hardware 101 detects an initial touch on the display surface, a change of touch position on the display surface and the disengagement of touch with the display surface, called "release", and sends this information to the touchscreen firmware 111. In the first two cases position information is sent to the touchscreen firmware 111. In the third case, information is transmitted indicating that a release has occured. In all cases, the touchscreen firmware 111 checks an internal coordinate map to determine what operation should be performed for the particular position on the screen as shown in FIG. 2. Depending on the current state of the touchscreen firmware 111 and the mapped operation for the position reported by the touchscreen hardware 101, some operation may be initiated.

(B) Control input to the touchscreen firmware

The touchscreen firmware 111 is called by the target program in order to establish certain environmental parameters as shown in FIG. 1. The overall result is to define what function is to be performed when a particular position cell on the display is touched by the user.

1. Enable/disable row and column touch data reporting mode

This mode causes the touch and/or release report data from the touchscreen hardware to be translated into a screen relative coordinate number pair corresponding to the row number and column number of the position touched by the user. The row and column data report is sent to the target program only if there is no field defined for the touched position (see sec. 6 below) or if the field reporting mode is disabled (see sec. 2 below). Field reporting always takes precedence over row and column reporting for a given screen position cell (FIG. 2).

2. Enable/disable touch field reporting mode

This mode causes the touch and/or release report data from the touchscreen hardware 101 to be translated into the particular operation defined for the touch field that occupies the position on the screen that has been touched by the user. See the discussion of touch fields in sec. 6 below.

3. Enable/disable the touch sensitivity of the softkey labels

This is controlled on an individual label by label basis. When enabled, touching a particular softkey label will cause the same action to be performed as would occur if the user operated a corresponding function key (i.e., an f-key) on the physical keyboard.

4. Toggle the ON/OFF state of the touchscreen firmware

When on, all functions as defined by the above described mode parameters will be operational. When off, all operations performed by the touchscreen firmware 111 will be deactivated. The touchscreen hardware 101 will still send touch data to the firmware 111 but the data will be ignored.

5. Reset the touchscreen firmware 111 to the "reset" state

The particular details of the reset state depend upon the mode parameters that have been defined per the above discussion. However, the reset state can be defined to be that state which exists after all operational modes have been defined but before any touch data has been received from the touchscreen hardware 101.

6. Define touch fields

This function allows the target program 120 to define rectangular areas of the screen so that the areas behave in a particular manner when touched and/or released. There are several different types of touch fields that can be defined. The different field types as described below have basic behavior modes that differ somewhat from one type to another but there is an underlying functionality that is common to them all.

(a) The rectangular area of the screen that is enclosed by the bounds of a particular field responds to touch as a whole entity. Touching one point within the area produces exactly the same effect as touching a different point within the area. If the field has been defined such that the display enhancement changes when touched and/or released, then the whole area will change its enhancement regardless of which point within the area has been touched.
  (b) The field is de-bounced. After the initial touch has been made in the field, further movement within the field is ignored until either a movement is made to a position outside of the bounds of the field or the touchscreen is released.
  (c) The field causes a particular operation to be initiated when it is touched and/or released by the user. There is a one to one mapping from an individual field to the operation that it initiates.
  (d) Visual and audio user feedback mechanisms (e.g., display brightness enhancement or an audible click) are utilized to assist the user in determining when his action to touch and/or release a field has been successful.

7. Delete touch fields

This function causes either an individual touch field or all existent touch fields to be deleted from the touchscreen environment.

(C) Data output from the touchscreen firmware

Touchscreen data may be sent to the target program by the touchscreen firmware 111 as a result of a touchscreen action performed by the user as shown in FIG. 1. With the exception of ASCII fields, the data generated is formatted in a manner so that the target program can distinguish it from other types of data (e.g., keyboard data). The touchscreen firmware 111 is capable of generating touchscreen data in both an internal binary form for communication with target programs running internally to the system and also in a control sequence form for communication with a remote target program. The data generated by ASCII fields is undistinguishable from data generated by operating the physical keyboard for either local or remote target programs.

(D) Control output from the touchscreen firmware

There are several types of control output from the touchscreen firmware 111 as shown in FIG. 1.

1. Softkey activation

Touching a softkey label causes the corresponding softkey function to be performed. This is considered to be a control function because it simulates operation of the equivalent function key on the physical keyboard. The operation of the particular softkey may be such that it sends data to the target program 120.

2. Keycode fields

Touch fields can be defined such that they behave exactly like a particular control key on the physical keyboard (e.g., cursor up, backspace and carriage return).

3. User feedback

All operations initiated by the touchscreen firmware 111 as a result of a user touch and/or release action causes an audible simulated keyboard click to occur. In addition, touch fields can be defined such that they cause an audible beep to occur when touched and so that the display enhancement of the touch field changes when touched and/or released.

4. Cursor positioning

Touch fields can also be defined such that the cursor is positioned at the upper left corner of the field when touched and/or released.

II. AIOS Touchscreen interface description

AIOS environment description with respect to touchscreen and touchscreen function definitions. This interface description applies only to local target programs.

(A) Touch field attributes

Four types of touch fields are available as follows:
1. ASCII Field:
   In this mode, a response string of ASCII characters is obtained by consecutive input operations. The first input obtains the first ASCII byte, and the second input obtains the second ASCII byte, etc. The response string is generated when the field is activated (touched and/or released) and is indistinguishable from the typing of the same string from the keyboard. Auto repeat, equivalent to depressing and holding a key on the physical keyboard, is also performed.
2. Keycode Field:
   The two data words of the response string are treated as a keycode and a qualifier and is processed by the regular keyboard routines. The final result of the touch will depend on the state and mode of keyboard processing. The touch simulates a key press on the physical keyboard and release simulates a key release. Auto-repeat is also performed.
3. Toggle Field:
   The touch field is defined as a toggle switch. Each touch of the area will toggle the field on or off. Whenever the field is touched, a report is generated for the application program. The report consists of three data bytes. The data can be obtained by three consdecutive keyboard input operations. The qualifier word of each data byte returned to the application contains the touchscreen identification. The three data bytes in hexidecimal notation of each report are:
   01 = toggle on field report opcode
   d1 = response string first byte
   d2 = response string second byte
   02 = toggle off field report opcode
   d1 = response string first byte
   d2 = response string second byte
4. Normal field:
   The touch field is defined so as to generate a report on touch and/or release. Each report consists of three data bytes. The data is again obtained by three consecutive keyboard input operations. The qualifier word of each data byte returned to the application program will have the touchscreen identification, and auto-repeat is also performed. The three data bytes of each report are:
   05 = field touched report opcode
   d1 = response string first byte
   d2 = response string second byte
   06 = field released report opcode
   d1 = response string first byte
   d2 = response string second byte Touch fields can overlap. If they do, then the most recent definition for a screen position cell takes precedence.

(B) Row and column reporting

The response bytes of row and column reporting, generated when a touch occurs, are obtained byte by byte using the keyboard input function of the operating system. Three data bytes are returned for each report. The qualifier word returned with each byte of data will have the touchscreen identification. The data bytes for touch report of row and column are:
   03 = row column touch report opcode
   d1 = touched row number in binary
   d2 = touched column number in binary The data bytes for release report of row and column are:
   04 = row column release report opcode
   d1 = touched row number in binary
   d2 = touched column number in binary (C) Touch screen control functions The following set of functions allow control of the touchscreen by a local target program.

1. Define Touch Field

| Inputs: | |
|---|---|
| (0,32) | The function code |
| ((STRING)) | Pointer to response string. Points to 2 words for a keycode field, the first word being the qualifier and the second word being the keycode. Points to 2 bytes for toggle or normal field, 0-80 bytes for ASCII field. |
| (LENGTH) | Response string length as defined above. |
| (ATTRIBUTE,MODE) | Reporting mode<br>1 = report when touched only.<br>2 = report when released only.<br>3 = report when both touched and released.<br>Touch attributes<br>1 = ASCII field<br>2 = keycode field<br>3 = toggle field<br>4 = normal field |

-continued

| | |
|---|---|
| (ON_ENH,OFF_ENH) | Enhancements of the field for on and off state for toggle field or the activated and deactivated state for ACII, keycode, and normal fields. |
| (CURSOR,BEEP) | BEEP 0 = will not beep when touched<br>1 = will beep when touched<br>CURSOR 0 = will not position cursor when toggled or activated<br>1 = will position cursor when toggled or activated |
| (LR_ROW,LR_COL) | Row and column of the lower right corner of the touch field |
| (UL_ROW,LR_COL) | Row and column of the upper left corner of the touch field |
| Outputs: | |
| AX: return status | |

2. Define Softkey Field

This function enables or disables one of the eight softkey label touch fields. When touched, the field will produce the same response as if the corresponding function key key is pressed. The default condition is that all softkey touch fields are enabled.

| | |
|---|---|
| Inputs: | |
| (0,33) | Function code |
| (MODE,KEY_NUMBER) | Softkey number = 1 through 8<br>Mode: 1 = enabled<br>0 = disabled |
| Outputs: | |
| AX: return status | |

3. Delete Touch Field

Deletes the touch field at the row and column position. Nothing happens if there is no touch field there. The row and column are screen relative coordinates.

| | |
|---|---|
| Inputs: | |
| (0,34) | Function code |
| (UL_ROW,UL_COL) | Position of field to be deleted<br>(−1, −1) deletes all fields |
| Outputs: | |
| AX: return status | |

4. Touchscreen Reset

Sets all fields to the off or deactivated state.

| | |
|---|---|
| Inputs: | |
| (0,35) | Function code |
| Outputs: | |
| AX: return status | |

5. Set Reporting Modes

This function controls the types of the touch screen reports and the reporting mode (touch/release) for row and column reports.

| | |
|---|---|
| Inputs: | |
| (0,36) | Function code |

-continued

| | |
|---|---|
| (,SCREEN_MODE) | Field or row and column reporting |

0 = Disable all reports. Softkey fields are still enabled.
1 = Enable row and column reporting only. All touches will report a row and column position. Touch fields are disabled.
2 = Enable touch field reporting only. Row and column reporting is disabled.
3 = Enable both row and column and field reporting. Row and column reporting will occur for areas not defined as touch fields.
4 = Toggle touchscreen on/off. When off, all touchscreen activity is disabled, including softkey fields. When on, all touchscreen activity is enabled as defined previously.
10..14 = Same as 0..4 but causes escape sequence reports to be generated. These codes are to be used only by the system parser.

| | |
|---|---|
| (,ROW_COL_MODE) | Row and column touch or release reporting. |
| 1 = report when touched. | |
| 2 = report when released. | |
| 3 = report when both touched and released. | |
| Outputs: | |
| AX: return status | |

III. Touchscreen escape sequence description—Control sequences

The following set of escape sequences allow control of the touchscreen from a remote target program running on a remote computer. All sequences described have an exact correspondence to operations supported by the AIOS touchscreen interface 121. A description of the functionality of those operations is explained in the next section IV.

The default condition of the touchscreen is that all reports are disabled. Consequently, it is possible to define fields and have them not respond to touch. The "Set modes" sequence as explained in section E must be used to enable the touchscreen before any reporting can proceed.

A. Define Touch Field

| | |
|---|---|
| ESC-zg \<rows\>r | Two numbers separated by a comma that define the upper and lower row bounds of the field. |
| \<cols\>c | Two numbers separated by a comma that define the left and right column bounds of the field. |
| \<0/1\>p | Disables/enables cursor positioning mode. |
| \<0/1\>b | Disables/enables beep on touch mode. |
| \<enhl\>e | Defines the enhancement for the off state of the field (see Table 1). |
| \<enh2\>f | Defines the enhancement for the on state of the field (see Table 1). |
| \<attr\>a | Defines the attribute of the field.<br>1 = ASCII field<br>3 = TOGGLE field<br>4 = NORMAL field |
| \<tmode\>m | Defines the touch mode for the field.<br>1 = Report on touch only<br>2 = Report on release only |

-continued

| | |
|---|---|
| <slen>L | 3 = Report on touch and release<br>Defines the report string length.<br>Can be 0 through 80 for ASCII fields and exactly 2 for TOGGLE and NORMAL fields. |
| <string> | The report string. Can be up to 80 ASCII characters of any variety for ASCII fields. Must be 2 lower case ASCII characters for TOGGLE and NORMAL fields. |

TABLE 1

| Security off: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Security on: | 16 | 17 | 18 | 19 | 20 | 21 | 22 | 23 | 24 | 25 | 26 | 27 | 28 | 29 | 30 | 31 |
| half-brightness | | | | | | | | | X | X | X | X | X | X | X | X |
| underline | | | | | X | X | X | X | | | | | X | X | X | X |
| inverse video | | | X | X | | | X | X | | | X | X | | | X | X |
| blinking | | X | | X | | X | | X | | X | | X | | X | | X |

B. Define Softkey Field

| | |
|---|---|
| ESC-z <1-8>s | The number of the softkey to be redefined. |
| <0/1>k | Disable/enable touch response. |

C. Delete Touch Field

| | |
|---|---|
| ESC-zd <row>r | Row coordinate of the upper left corner of the field to be deleted. |
| <col>c | Col coordinate of the upper left corner of the field to be deleted. |

If the r and c parameters are omitted then all fields will be deleted.

D. Touch Screen Reset

| | |
|---|---|
| ESC-zJ | Resets all fields to the off state. |
| E. Set Modes | |
| ESC-z <smode>n | Screen mode.<br>0 = Disable all reports. Softkeys are still active unless explicitly disabled by the "Define softkey field" sequence.<br>1 = Enable ROW,COL reporting only<br>2 = Enable touch field reporting only<br>3 = Enable both ROW,COL and touch field reporting<br>4 = Toggle touchscreen on/off. When off, all touchscreen operations are deactivated, include softkey response. |
| <tmode>m | Touch mode for ROW,COL reporting.<br>1 = Report on touch only<br>2 = Report on release only<br>3 = Report on touch and release |

IV. Touchscreen Escape Sequence Description-Report Sequences

The following sequences are returned to the remote application as the result of the user touching and/or releasing the screen. For ASCII fields, the report string is returned as though it were typed from the keyboard. For NORMAL and TOGGLE fields, the following sequences are returned:

| | |
|---|---|
| ESC-z <string> | The field id. This consists of the two lower case ASCII characters which were defined as the report string when the field was defined. |
| <type>Q | The report type.<br>1 = TOGGLE field on report<br>2 = TOGGLE field off report<br>5 = NORMAL field touch report<br>6 = NORMAL field release report |

C. For row and column reporting, the following sequence is returned.

| | |
|---|---|
| ESC-z <row>x | The screen relative row position. |
| <col>y | The screen relative col position. |
| <type>Q | The report type.<br>3 = row and column touch report<br>4 = row and column release report |

Figure 3:
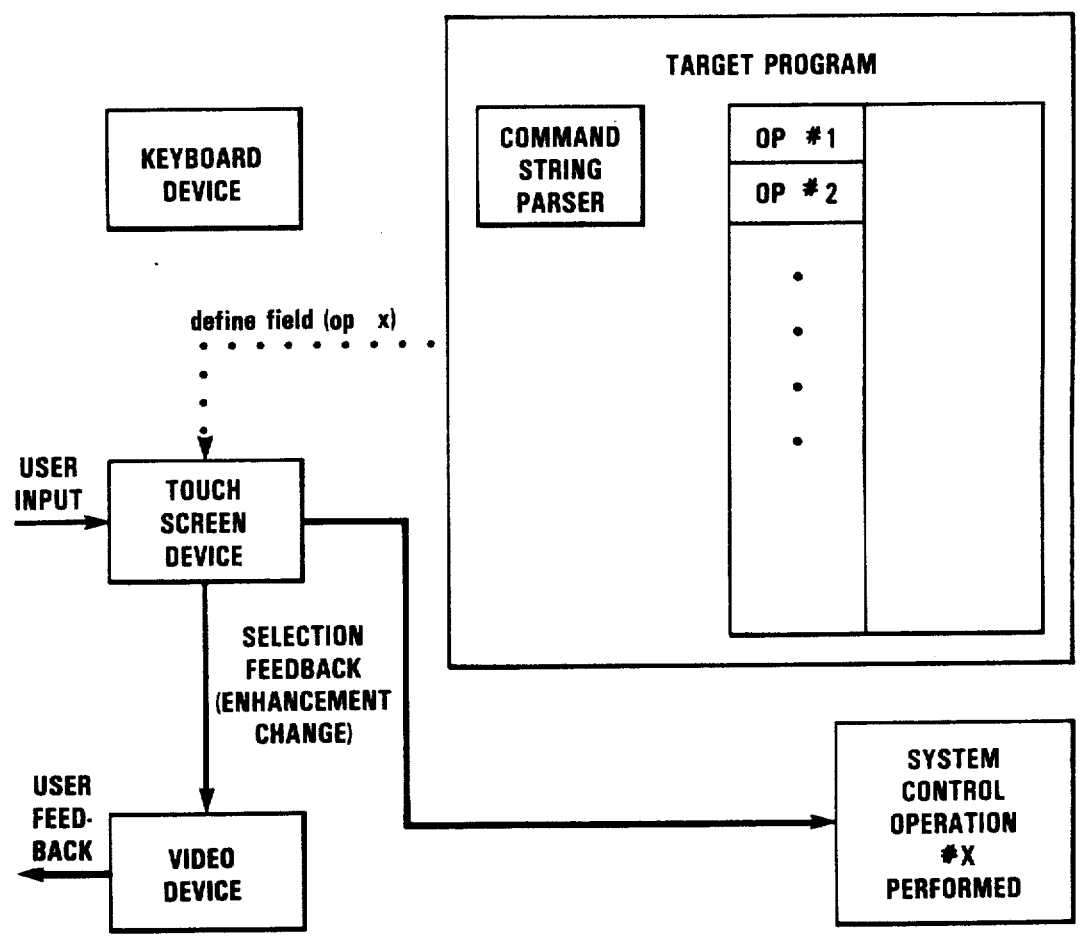
FIG. 3 is a block diagram of the touchscreen system used for defining, selecting and activating a system operation.
Figure 4:
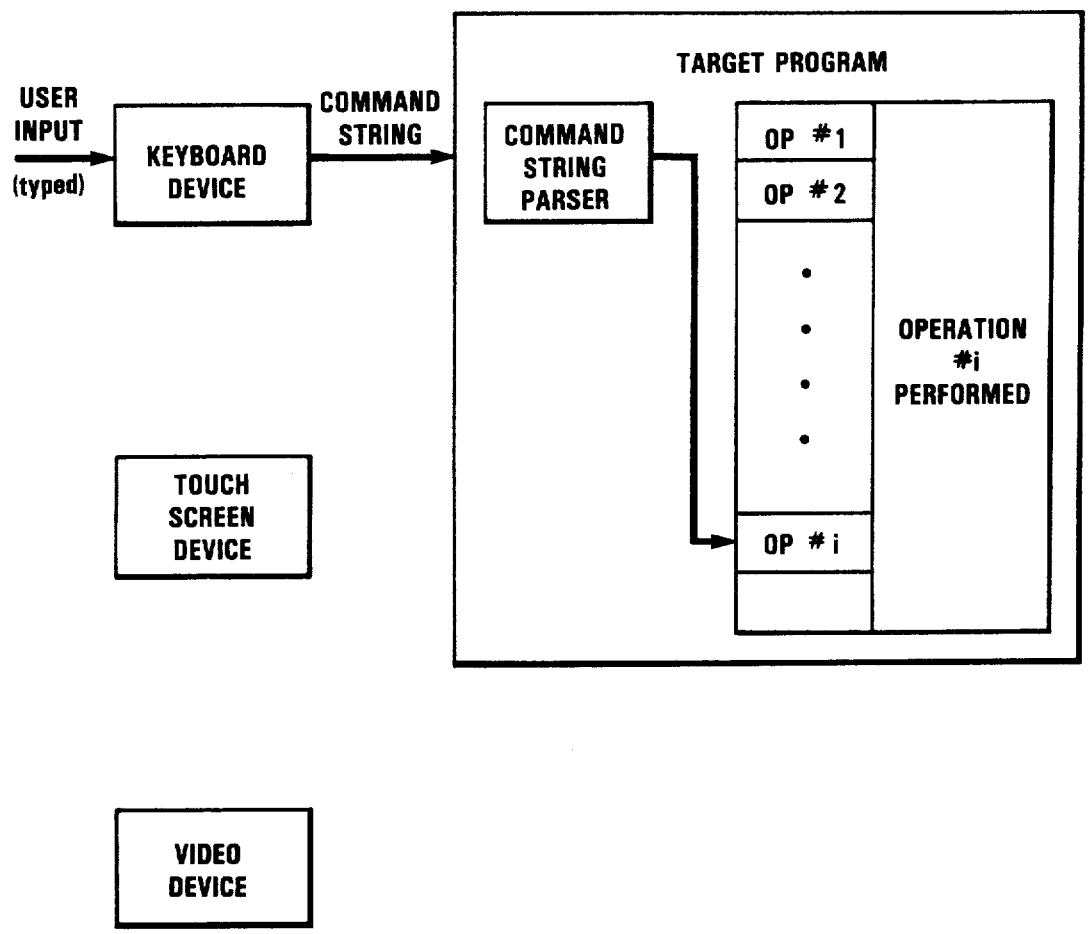
FIG. 4 is a block diagram illustrating normal use of the conventional keyboard to issue commands.
Figure 5:
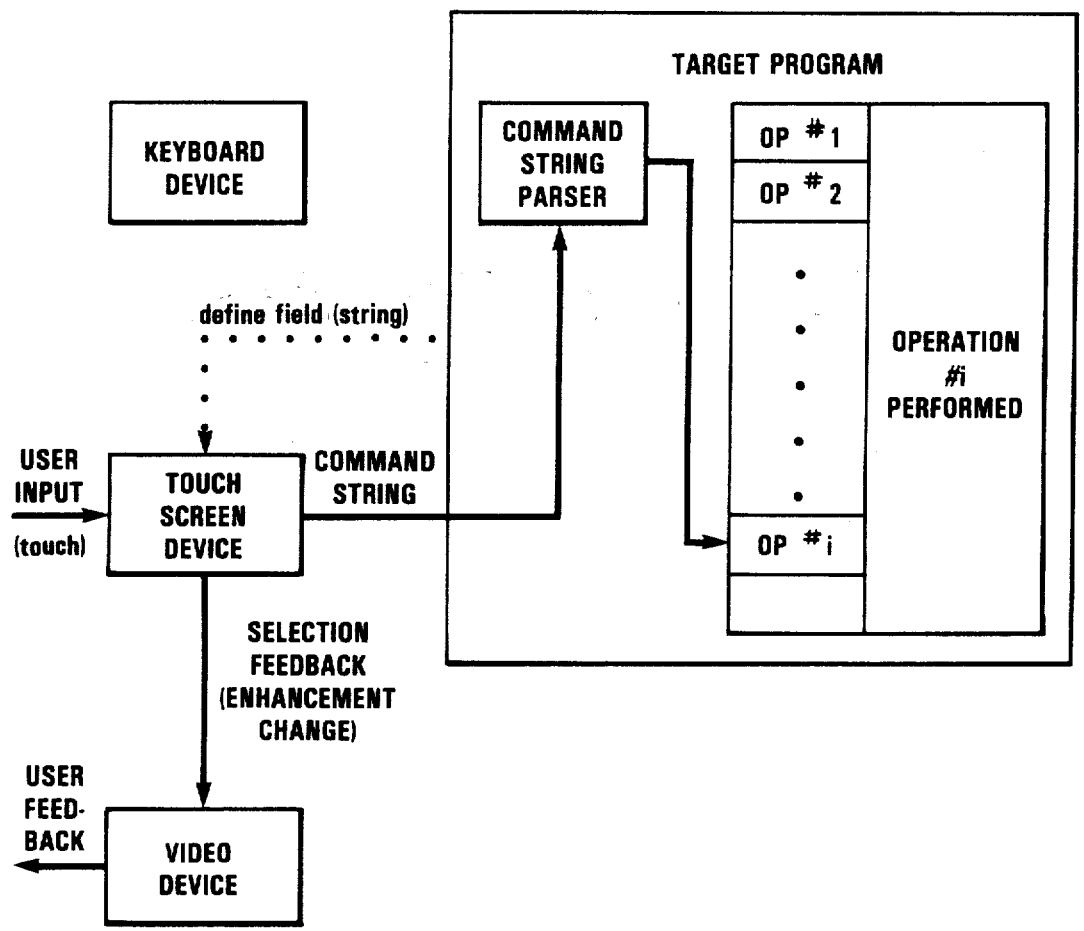
FIG. 5 is a block diagram illustrating use of a touchscreen to issue commands.

As explained above, the touchscreen firmware in combination with the touchscreen hardware creates an intelligent programmable device. There are two basic modes in which the touchscreen system will be used by target programs. Firstly, the target program can define a touch field such that, when touched by the user, it will initiate some system control operation (e.g., tab, enter remote mode, clear display, etc.). When selected by the user, the control operation will occur without the target program ever being, or needing to be informed of it as shown in FIG. 3. Secondly, the target program can define touch fields that operate in a manner similar to traditional programmable function keys. When touched, the field will return a character string to the target program. This string, which is defined by the target program, can be a command for the target program. The string is identical to the equivalent command entered via the keyboard as shown in FIGS. 4 and 5. In FIG. 4 the user must perform several sequential actions successfully in order to issue the command via the keyboard. In FIG. 5 the user must perform only one action successfully in order to have the touchscreen device issue the command. In addition, the string can be several commands concatenated together or can be data for the program. Alternatively, the report string can be used as a field identification code. In this later case, the target program must keep track of the "meaning" of each field that is defined and when the target program receives a particular field identification code, the corresponding operation is initiated by the target program. This method requires more intelligence on the part of the target program than prior methods, but still requires less intelligence than previous menu selection systems. The mapping from touchscreen position to field selection and the associated user feedback functions are still performed automatically for the target program. These methods of operation are different from prior art programmable function keys in that the size, shape and position of the field (key labels) on the screen are defined by the target program. Also, selection and activation is done by touching the screen as opposed to operating a key switch on the physical keyboard.

In the second case of touch activated softkeys, the user is able to select the desired operation by touching the function label on the display screen. Because the function label and the function key are not separate, the possibility of erroneous selection is very low.

We claim:

1. In a computing system, an apparatus comprising:
   first detecting means for detecting an initial touch on a display surface;
   second detecting means for detecting a change of touch position on said display surface; and
   internal coordinating means coupled to said first and second detecting means for determining what operation should be performed for each touch position detected by said first and second detecting means.

2. An apparatus according to claim 1, wherein said change of touch position is across a screen of said display surface.

3. An apparatus according to claim 1, wherein said change of touch position is away from a screen of said display surface.

4. In a computing system, an apparatus comprising:
   first detecting means for detecting a change of touch position on said display surface;
   second detecting means for detecting a change of touch position on said display surface;
   third detecting means for detecting a disengagement of touch with said display surface and for sending information indicating that a release has occurred; and
   internal coordinating means coupled to said first, second and third detecting means for determining what operation should be performed for each touch position detected by said first and second detecting means, and for determining what operation should be performed by said third detecting means.

5. In a computing system, an apparatus comprising:
   first detecting means for detecting an initial touch on a display surface;
   second detecting means for detecting a change of touch position on said display surface, said change of touch position being across a screen of said display surface;
   third detecting means for detecting a disengagement of touch with said display surface to send information indicating that a release has occurred; and
   internal coordinating means coupled to said first, second and third detecting means to determine what operation should be performed for the touch position information detected by said first and second means, and to determine what operation should be performed by said third detecting means.

6. In a computing system, an apparatus comprising:
   touchscreen initiating means for determining operations in response to information from a touchscreen independently from a target function; and
   operating system means coupled to said touchscreen initiating means for executing said target function in response to said information from said touchscreen.

7. In a computing system, an apparatus comprising:
   first detecting means for detecting an initial touch on a display surface;
   second detecting means for detecting a change of touch position on said display surface;
   internal coordinating means coupled to said first and second detecting means for determining what operation should be performed for each touch position detected by said first and second detecting means;
   touchscreen intiating means coupled to said internal coordinating means for determining operations in responding to said information from said touchscreen independently from a target function; and
   operating system means coupled to said internal coordinating means for executing said target function in response to said information from said touchscreen.

8. In a computing system, an apparatus comprising:
   touchscreen means for defining a touchscreen position to have a desired functional meaning; and
   means for receiving said definition of touchscreen position, and for communicating said functional meaning to said touchscreen means in response to user selection of said touchscreen position.

9. In a computing system, an apparatus comprising:
   touchscreen means for determining operations in response to information from a touchscreen independently from a target function; and
   feedback means coupled to said touchscreen means for providing an indication to a user of a status of said touch screen means.

10. An apparatus according to claim 9, wherein the indication provided by said feedback means is defined by said target function.

11. An apparatus according to claim 9, wherein said feedback means is an audio indication.

12. An apparatus according to claim 9, wherein said feedback means is a video indication.

13. An apparatus according to claim 9, wherein said feedback means is an audio and video indication.

14. In a computing system, an apparatus comprising:
   data input means having
      first detecting means for detecting an initial touch on a display surface, and
      second detecting means for detecting a change of touch position on said display surface;
   internal coordinating means coupled to said data input means, said internal coordinating means, having a control input from a target function, and an output of data to the target function, said internal coordinating means for determining what operation should be performed for each touch position detected by said first and second detecting means;
   control input means coupled to the internal coodinating means for establishing an environmental parameter to define what function is to be performed by the control input from the target function;
   data output means coupled to the internal coodinating means for allowing the target function to distinguish the output of data from the internal coordinating means from other types of data; and
   control output means coupled to the internal coodinating means for providing a control output to define a particular control function.

15. An apparatus according to claim 14, wherein said environmental parameter defines an enable/disable row and column touch data reporting mode, causing a touch and/or release report data from the data input means to be translated into a relative coordinate number pair of the display surface, corresponding to a row number and a column number of a position touched by a user.

16. An apparatus according to claim 14, wherein said environmental parameter defines an enable/disable touch field reporting mode, causing a touch and/or release report data from the data input means to be translated into a particular operation defined for a touch field that occupies a position on the display surface touched by a user.

17. An apparatus according to claim 14, wherein said environmental parameter defines a mode for enabling/disabling touch sensitivity of softkey labels, causing the same action to be performed as if a user operated a corresponding function key on a physical keyboard.

18. An apparatus according to claim 14, wherein said environmental parameter defines a mode for toggling the on/off state of the internal coordinating means, causing all operations performed by the internal coordinating means to be deactivated.

19. An apparatus according to claim 14, wherein said environmental parameter defines a mode for resetting the internal coordinating means to a reset state.

20. An apparatus according to claim 14, wherein said environmental parameter defines a mode for defining a touch field, causing the target function to define a rectangular area of the display surface so that the area behaves in a particular manner when touched and/or released.

21. An apparatus according to claim 20, wherein said rectangular area of the display surface is enclosed by bounds of a particular field to respond to touch as a whole entity.

22. An apparatus according to claim 20, wherein said touch field is de-bounced, after the initial touch has been made in the touch field.

23. An apparatus according to claim 20, wherein said touch field causes a particular operation to be initiated when it is touched and/or released by a user.

24. An apparatus according to claim 20, wherein a visual user feedback mechanism is utilized to assist a user in determining when the user's action to touch and/or release said touch field has been successful.

25. An apparatus according to claim 20, wherein an audio user feedback mechanism is utilized to assist a user in determining when the user's action to touch and/or release said touch field has been successful.

26. An apparatus according to claim 14, wherein said environmental parameter defines a mode for deleting the touch field, causing the touch field to be deleted from the display surface of the touchscreen.

27. An apparatus according to claim 14, wherein said initial touch on the display surface is touching a softkey label which causes a corresponding softkey function to be performed by the control output.

28. An apparatus according to claim 14, wherein said initial touch on the display surface is in a touch field which is defined such that the touch field behaves like a particular control key on a physical keyboard by the control output.

29. An apparatus according to claim 14, wherein said initial touch and/or said change of touch position on said display surface causes an audible simulated keyboard click to occur by the control output.

30. An apparatus according to claim 14, wherein said initial touch on the display surface is in a touch field which is defined such that a cursor is positioned by the control output.

* * * * *

UNITED STATES PATENT AND TRADEMARK OFFICE
CERTIFICATE OF CORRECTION

PATENT NO. : 4,587,630

DATED : May 6, 1986

INVENTOR(S) : Peter R. Straton and Scott R. McClelland

It is certified that error appears in the above-identified patent and that said Letters Patent is hereby corrected as shown below:

Column 7, line 18 "(UL_ROW,LR_COL)" should read -- (UL_ROW,UL_COL) -- .

Signed and Sealed this

Twenty-first Day of October, 1986

[SEAL]

Attest:

DONALD J. QUIGG

Attesting Officer     Commissioner of Patents and Trademarks